US010479862B2

(12) United States Patent
Adkins et al.

(10) Patent No.: US 10,479,862 B2
(45) Date of Patent: Nov. 19, 2019

(54) AMINE BASED POLYMER POLYOL STABILIZERS

(71) Applicant: Covestro LLC, Pittsburgh, PA (US)

(72) Inventors: Rick L. Adkins, Canonsburg, PA (US); Anthony R. Loveday, Weirton, WV (US)

(73) Assignee: Covestro LLC, Pittsburgh, PA (US)

( * ) Notice: Subject to any disclaimer, the term of this patent is extended or adjusted under 35 U.S.C. 154(b) by 51 days.

(21) Appl. No.: 15/834,709

(22) Filed: Dec. 7, 2017

(65) Prior Publication Data

US 2019/0177476 A1 Jun. 13, 2019

(51) Int. Cl.
| | |
|---|---|
| C08G 65/26 | (2006.01) |
| C08J 9/34 | (2006.01) |
| C08K 5/17 | (2006.01) |
| C08L 33/10 | (2006.01) |
| C08L 71/02 | (2006.01) |
| C08L 75/04 | (2006.01) |

(52) U.S. Cl.
CPC ............ *C08G 65/2621* (2013.01); *C08J 9/34* (2013.01); *C08K 5/17* (2013.01); *C08L 33/10* (2013.01); *C08L 71/02* (2013.01); *C08L 75/04* (2013.01); *C08J 2205/06* (2013.01); *C08J 2205/08* (2013.01)

(58) Field of Classification Search
CPC ..... C08G 65/2621; C08J 9/34; C08J 2205/06; C08J 2205/08; C08K 5/17; C08L 33/10; C08L 71/02; C08L 75/04
USPC ......................................................... 524/186
See application file for complete search history.

(56) References Cited

U.S. PATENT DOCUMENTS

| | | | |
|---|---|---|---|
| 3,073,788 A | 1/1963 | Hostettler et al. | |
| 3,953,393 A | 4/1976 | Ramlow et al. | |
| 4,119,586 A | 10/1978 | Shah | |
| 4,148,840 A | 4/1979 | Shah | |
| 4,242,249 A | 12/1980 | Van Cleve et al. | |
| 4,286,074 A | 8/1981 | Davis et al. | |
| 4,327,005 A | 4/1982 | Ramlow et al. | |
| 4,334,049 A | 6/1982 | Ramlow et al. | |
| 4,463,107 A | 7/1984 | Simroth et al. | |
| 4,745,153 A | 5/1988 | Hoffman | |
| 4,954,561 A | 9/1990 | Gerkin et al. | |
| 4,972,002 A | 11/1990 | Volkert | |
| 4,997,857 A | 3/1991 | Timberlake et al. | |
| 5,093,412 A | 3/1992 | Mente et al. | |
| 5,196,476 A | 3/1993 | Simroth | |
| 5,268,418 A | 12/1993 | Simroth | |
| 5,324,774 A | 6/1994 | Nishikawa et al. | |
| 5,364,906 A | 11/1994 | Critchfield et al. | |
| 5,428,908 A | 7/1995 | Kerfoot | |
| 5,476,969 A | 12/1995 | Hinz et al. | |
| 5,494,957 A | 2/1996 | Moore et al. | |
| 5,554,662 A | 9/1996 | Sanders et al. | |
| 5,594,066 A * | 1/1997 | Heinemann | C08F 290/062 252/182.25 |
| 5,783,513 A | 7/1998 | Combs et al. | |
| 5,814,699 A | 9/1998 | Kratz et al. | |
| 5,854,358 A | 12/1998 | Heinemann et al. | |
| 5,854,386 A | 12/1998 | Shen et al. | |
| 5,990,185 A | 11/1999 | Fogg | |
| 5,990,232 A | 11/1999 | Shen et al. | |
| 6,013,731 A | 1/2000 | Holeschovsky et al. | |
| 6,303,533 B1 | 10/2001 | Grosch et al. | |
| 6,303,833 B1 | 10/2001 | Grosch et al. | |
| 6,455,603 B1 | 9/2002 | Fogg | |
| 6,602,450 B1 | 8/2003 | Sato et al. | |
| 6,617,413 B1 | 9/2003 | Bruchmann et al. | |
| 6,624,209 B2 | 9/2003 | Kawamoto et al. | |
| 6,762,274 B2 | 7/2004 | Waddington et al. | |
| 7,160,975 B2 | 1/2007 | Adkins et al. | |
| 7,179,882 B2 | 2/2007 | Adkins et al. | |
| 7,361,695 B2 | 4/2008 | Tu et al. | |
| 7,456,229 B2 | 11/2008 | Hager et al. | |
| 7,759,423 B2 | 7/2010 | Chauk | |
| 7,776,969 B2 | 8/2010 | Adkins | |
| 8,835,565 B2 * | 9/2014 | England | C08F 222/30 525/118 |
| 9,505,881 B1 | 11/2016 | Adkins et al. | |
| 2005/0043421 A1 | 2/2005 | Van Der Wal et al. | |
| 2016/0332390 A1 * | 11/2016 | Harasin | B29C 70/30 |
| 2017/0306076 A1 | 10/2017 | Adkins et al. | |

OTHER PUBLICATIONS

Adkins, Rick L. et al.; U.S. Appl. No. 10/687,156; "Novel Unsaturated Macromers for Preformed Stabilizers and Polymer Polyols"; filed Oct. 16, 2003.

England, Jiong et al.; U.S. Appl. No. 13/449,492; "Preformed Stabilizers Useful for the Production of Polymer Polyols and Polymer Polyols Produced Therefrom", filed Apr. 18, 2012.

\* cited by examiner

*Primary Examiner* — Hui H Chin
(74) *Attorney, Agent, or Firm* — N. Denise Brown

(57) ABSTRACT

This invention relates to novel macromers prepared from amine based polyols, preformed stabilizers prepared from these macromers, and to polymer polyols prepared from the preformed stabilizers. The present invention also relates to processes for preparing these compositions.

26 Claims, No Drawings

US 10,479,862 B2

AMINE BASED POLYMER POLYOL STABILIZERS

FIELD

This invention relates to stabilizers for polymer polyols that comprise an amine initiated polyether polyol. These stabilizers include ethylenically unsaturated macromers and preformed stabilizers comprising these macromers. The invention also relates to polymer polyols comprising these macromers and preformed stabilizers, and to processes for the preparation of these compositions.

BACKGROUND

Polymer polyols, also known as filled polyols, are viscous fluids comprising fine particles dispersed in polyols. Examples of solids used include styrene-acrylonitrile co-polymers and polyureas. The solids are typically prepared by in situ polymerization of ethylenically unsaturated monomers in the base polyol. Polymer polyols are commonly used for the production of polyurethane foams, and particularly flexible polyurethane foams.

Macromers are known and have been used to stabilize polymer polyols by co-polymerization with one or more ethylenically unsaturated monomers (such as, for example, styrene and acrylonitrile). Because of similarities in chemical composition, the polyether tail(s) energetically favor association with the polyol molecules in the continuous phase rather than with the styrene-acrylonitrile co-polymer. The polyether tails extend into the continuous phase, thereby forming a "brush" layer near the particle-fluid interface which screens the attractive van der Waals forces between particles. This phenomenon is known as steric stabilization. In order to form a brush layer which effectively screens van der Waals forces several conditions must be met. The polyether tails must be similar in chemical composition to the continuous phase so that they fully extend into the continuous phase and do not adsorb to the particles. Also, the surface coverage and molecular weight must be high enough so that the interfacial brush layer is sufficiently thick to prevent agglomeration of the solid particles.

It is known that large, bulky molecules are effective macromers because less material can be used to sterically stabilize the particles. Generally speaking, this is due to the fact that a highly branched polymer has a considerably larger excluded volume than a linear molecule (such as, e.g., a monol), and therefore less of the branched polymer is required. Coupling multi-functional polyols with polyisocyanates is also known and described in the field of polymer polyols as a suitable means to increase the molecular weight of the macromer.

Pre-formed stabilizers (PFS) are known to be useful for preparing polymer polyols having a lower viscosity at a high solids content. In general, a pre-formed stabilizer is an intermediate obtained by reacting a macromer which contains reactive unsaturation (e.g. acrylate, methacrylate, maleate, etc.) with a monomer (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <20%), or soluble grafts, etc.). Thus, in the pre-formed stabilizer process, a macromer is reacted with monomers to form a co-polymer composed of macromer and monomers. These co-polymers comprising a macromer and monomers are commonly referred to as pre-formed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

It has surprisingly been found that, by incorporating an amine initiated compound into the molecule during the polyether polyol synthesis, the resulting polymer polyols have lower viscosity and the resulting polyurethane foam is measurably more stable as measured by foam settling compared to traditional macromers.

SUMMARY

This invention relates to an ethylenically unsaturated macromer comprising the reaction product of: (a) an amine initiated polyether polyol having a hydroxyl functionality of 3 to 8, having a number average molecular weight of from 4000 to 15,000, and which comprises the reaction product of (i) an amine compound having an amine functionality of from 1 to 6 and a molecular weight of from 60 to 1000, wherein the amine groups are selected from primary and/or secondary amine groups, and optionally from tertiary amine groups, with the proviso that one or more primary and/or secondary amine groups is also present when a tertiary amine group is present; with (ii) one or more alkylene oxides; with (b) an ethylenically unsaturated compound which is present in an amount such there is at least 0.08 mole unsaturation/mole polyol present in the resultant macromer; optionally, in the presence of (c) at least one catalyst.

The present invention also relates to a preformed stabilizer comprising the free-radical polymerization product of: (1) the novel ethylenically unsaturated macromer described above, with (2) at least one ethylenically unsaturated monomer; in the presence of: (3) at least one free-radical polymerization initiator; and, optionally, (4) a liquid diluent; and, optionally, (5) a polymer control agent.

This invention also relates to a polymer polyol comprising the free-radical, in-situ polymerization product of: (A) a base polyol, with (B) the novel preformed stabilizer described herein, and (C) at least one ethylenically unsaturated monomer, in the presence of (D) at least one free-radical polymerization initiator, and, optionally, (E) a polymer control agent.

The invention also relates to a polyurethane foam that comprises the reaction product of a di- or polyisocyanate with an isocyanate-reactive component which comprises the polymer polyol described herein, in the presence of a catalyst, a blowing agent and/or a surfactant.

The present invention also relates to a process for the preparation of the novel ethylenically unsaturated macromer. This process comprises: (1) reacting (a) an amine initiated polyether polyol having a hydroxyl functionality of 3 to 8 and having a number average molecular weight of from 4000 to 15,000 which comprises the reaction product of (i) an amine compound having an amine functionality of from 1 to 6 and a molecular weight of from 60 to 1000, wherein the amine groups are selected from primary and/or secondary amine groups, and optionally from tertiary amine groups, with the proviso that one or more primary and/or secondary amine groups is also present when a tertiary amine group is present; with (ii) one or more alkylene oxides; with (b) an ethylenically unsaturated compound which is present in an amount such there is at least 0.08 mole unsaturation/mole polyol present in the resultant macromer; optionally, in the presence of (c) at least one catalyst.

This invention also relates to a process for preparing preformed stabilizers. This process comprises (A) free-radically polymerizing: (1) the ethylenically unsaturated macromer described above; with (2) at least one ethylenically unsaturated monomer; in the presence of: (3) at least one free-radical polymerization initiator; and, optionally, (4) a liquid diluent; and, optionally, (5) a polymer control agent.

The present invention is also directed to a process for preparing these polymer polyols. This process comprises (I) free-radically polymerizing (A) a base polyol, (B) the preformed stabilizer described above, and (C) an ethylenically unsaturated monomer, in the presence of (D) a free-radical polymerization initiator, and, optionally, (E) a polymer control agent.

The invention also relates to a process for preparing a polyurethane foam. This process comprises reacting a reaction mixture that comprises a di- or polyisocyanate, with an isocyanate-reactive component comprising the polymer polyol described herein, in the presence of a catalyst, a blowing agent and/or a surfactant.

DETAILED DESCRIPTION

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, as determined by GPC as described herein, unless indicated otherwise.

The number average and weight average, $M_n$ and $M_w$, respectively, molecular weights herein were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provides an isocyanate index of 100%.

The term "monomer" means the simple unpolymerized form of a chemical compound having relatively low molecular weight, e.g., acrylonitrile, styrene, methyl methacrylate, and the like.

The phrase "polymerizable ethylenically unsaturated monomer" means a monomer containing ethylenic unsaturation ($>C=C<$, i.e. two double bonded carbon atoms) that is capable of undergoing free radically induced addition polymerization reactions.

The term pre-formed stabilizer is defined as an intermediate obtained by reacting a macromer containing reactive unsaturation (e.g. acrylate, methacrylate, maleate, etc.) with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

As used herein, the phrase "mole unsaturation/mole polyol" is a calculated value which is determined by dividing the number of moles of unsaturated compound (e.g. TMI, maleic anhydride, etc.) used by the number of moles of polyol. The number of moles of polyols is based on the molecular weight of the polyol as determined by GPC as described herein).

As used herein, the phrase "polyol feed" refers to the amount of base polyol feed present in the polymer polyol or present in the process of preparing the polymer polyol.

As used herein, the phrase "total feed" refers to the sum of all quantities of components present in each of the various products (i.e., preformed stabilizers, polymer polyols, etc.) and/or present in the process of preparing each of the various products.

The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene:acrylonitrile in the total polymer. One skilled in the art will recognize that this is an analytical confirmation of the main mechanism for controlling the S/AN ratio, which is the wt. % of monomers in the total reactor feed.

Hydroxyl numbers or OH numbers were determined according to ASTM D4274-11, and are reported in mg [KOH]/g [polyol].

As used herein "viscosity" is in millipascal-seconds (mPa·s) measured at 25° C. The viscosity was measured on an Anton Paar SVM3000 viscometer at 25° C. that has been demonstrated to give equivalent results as can be generated with ASTM-D4878-15. The instrument was calibrated using mineral oil reference standards of known viscosity.

The ethylenically unsaturated macromers comprise the reaction product of: (a) an amine initiated polyether polyol having a hydroxyl functionality of 3 to 8, and a number average molecular weight of from 4000 to 15,000; with (b) an ethylenically unsaturated compound which is present in a sufficient amount such that there is at least 0.08 mole unsaturation/mole polyol present in the resultant macromer; optionally, in the presence of (c) at least one catalyst.

Suitable amine initiated polyether polyols may have a number average molecular weight of at least about 4000, or at least about 5000, or at least about 6000. The number average molecular weight of these amine initiated polyether polyols may be about 15,000 or less, or about 14,000 or less, or about 13,000 or less. These amine initiated polyether polyols may have a number average molecular weight ranging between any combination of these upper and lower values, inclusive, such as, for example, from at least about 4000 to about 15,000 or less, or from at least about 5000 to about 14,000 or less, or from at least about 6000 to about 13,000 or less.

The hydroxyl functionality of these amine initiated polyether polyols may be at least about 3, or at least about 3.5, or at least about 4. The hydroxyl functionality of these amine initiated polyether polyols may also be 8 or less, or 7.5 or less, or 7 or less. In general, these polyether polyols may have a hydroxyl functionality ranging between any combination of these upper and lower values, inclusive, such as, for example, from at least about 3 to about 8 or less, or from at least about 3.5 to about 7.5 or less, or from at least about 4 to about 7 or less.

Suitable amine initiated polyether polyols comprise the reaction product of (i) an amine compound having an amine functionality of from 1 to 6 and a number average molecular weight of from 60 to 1000, wherein the amine groups are selected from primary and/or secondary amine groups, and optionally, from tertiary amine groups, with the provision that there are one or more primary and/or secondary amine groups also present when a tertiary amine group is present; with (ii) an alkylene oxide, optionally in the presence of (iii) an alkoxylation catalyst.

Suitable alkoxylation catalysts for preparing the amine-started polyether polyols include, for example, sodium hydroxide, potassium hydroxide, sodium or potassium methoxide, sodium stearate, calcium oxide, and N-methyl imidazole. Also suitable are double metal cyanide (DMC) catalysts such as those disclosed in U.S. Pat. Nos. 5,428,908, 5,783,513, 6,303,533, and 6,303,833, the disclosures of which are herein incorporated by reference.

The suitable amine compounds (i) for the amine initiated polyether polyol (a) have a number average molecular weight of from about 60 to about 1000. These amine compounds may have a number average molecular weight of at least 60, or at least about 70, or at least about 80. Suitable amine compounds may also have a number average molecular weight of about 1000 or less, or about 800 or less, or about 600 or less. In general, these amine compounds may have a number average molecular weight ranging between any combination of these upper and lower values, inclusive, such as, for example, of from about 60 to about 1000, or from about 70 to about 800, or from about 80 to about 600.

The amine compounds suitable herein have an amine functionality of from about 1 to about 6. The functionality of these amine compounds is at least about 1, or at least about 2. The functionality of these amine compounds may also be about 6 or less, or about 4 or less. In general, suitable amine compounds may have an amine functionality ranging between any combination of these upper and lower values, inclusive, such as, for example, from about 1 to about 6, or from about 2 to about 4.

The amine compounds suitable herein will satisfy the functionality requirements set forth above, with the amine groups being selected from primary and/or secondary amine groups. In accordance with the invention, it is also possible that the amine compound will optionally contain one or more tertiary amine groups, provided that one or more primary and/or secondary amine groups are also present, and the above functionality requirements for primary and/or secondary amine groups are adhered to. Amine compounds which only contain tertiary amine groups are not suitable herein as the amine compound (i). Amine compounds which contain both a primary and/or secondary amine group and one or more hydroxyl groups can also be used as the amine group containing compound herein. The suitability of these types of compounds is based on the amine functionality and number average molecular weight of the compound. Obviously any hydroxyl functionality present in the amine group containing compound will affect the overall functionality of the final product, i.e. the amine initiated polyol.

Some examples of suitable amine compounds include, for example, crude toluene diamine obtained by the nitration of toluene followed by reduction, 2,3-toluene diamine, 3,4-toluene diamine, 2,4-toluene diamine, and 2,6-toluene diamine or mixtures thereof, aniline, 4,4'-methylene dianiline, methylene-bridged polyphenyl polyamines composed of isomers of methylene dianilines and triamines or polyamines of higher molecular weight prepared by reacting aniline with formaldehyde by methods known in the art, ammonia, alkanol amines such as monoethanol amine, diethanolamine, organic amines such as methyl amine, ethylene diamine, diethylene triamine and the like, and Mannich reaction products of phenol or substituted phenols with alkanol amines and formaldehyde or paraformaldehyde. Mixture of the above amines may also be used. Aliphatic amines or mixtures of aliphatic amines are preferred. Examples of these aliphatic amines are monoethanolamine, diethanolamine, methyl amine, ethylene diamine, diethylene triamine, triethylene tetramine, etc.

Examples of alkylene oxides useful in producing the amine-initiated polyether polyols include: ethylene oxide, propylene oxide, butylene oxide, styrene oxide, epichlorohydrin and mixtures thereof. The alkylene oxides may be added as mixtures or added sequentially to produce block copolymers. In one embodiment, the alkylene oxide comprises ethylene oxide, propylene oxide and/or a mixture thereof. When used in a mixture, ethylene oxide can be added into the backbone (i.e. polyol is terminated with propylene oxide) or can be added to give an ethylene oxide cap.

As is known in the art, the epoxidation reaction typically occurs by contacting the amine compound with the alkylene oxide(s) at an elevated temperature in the range of from 90 to 180° C., under moderately elevated pressure in the presence of the catalyst. In some embodiments, after about 5 to 30% by weight of 100% by weight of alkylene oxide to be added is contacted with an amine starter and allowed to react, then from about 0.001 to 0.500 weight percent of the catalyst, based on the weight of the finished polyol, is added to the epoxidizing mixture, and finally, the remaining amount of alkylene oxide is added to complete the epoxidation.

Suitable ethylenically unsaturated compounds which contain hydroxyl-reactive groups are present in an amount sufficient to ensure that there is at least 0.08 mole unsaturation/mole polyol present in the resultant macromer. Some examples of suitable ethylenically unsaturated compounds include compounds such as methyl methacrylate, ethyl methacrylate, maleic anhydride, 3-isopropenyl-α,α-dimethyl benzyl isocyanate, 2-isocyanatoethyl methacrylate, adducts of isophorone diisocyanate and 2-hydroxyethyl methacrylate, adducts of toluenediisocyanate and 2-hydroxypropyl acrylate, etc.

Suitable catalysts (c) for the macromers herein include virtually any catalyst known to be suitable for urethane reactions can be used as component (c) in the present invention. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Also catalysts such as bismuth(III) neodecanoate.

The ethylenically unsaturated macromer typically comprises the reaction product of (a) an amine initiated polyether polyol, with (b) an ethylenically unsaturated compound containing hydroxyl reactive groups which is present in an amount such that there is at least 0.08 mole unsaturation/mole polyol (or at least 0.10 mole unsaturation/mole polyol) present in the resultant macromer, optionally, in the presence of (c) at least one catalyst, at temperatures of about 25 to about 250° C. for time periods of from about 1 to about 10 hours. It is preferred that this reaction is at temperatures of about 60 to about 200° C. for a time of from about 2 to about 7 hours.

The preformed stabilizers herein comprise the free-radical polymerization product of: (1) a macromer as described herein, with (2) at least one ethylenically unsaturated monomer, in the presence of (3) at least one free-radical polymerization initiator and, optionally, (4) a liquid diluent, and, optionally, (5) a polymer control agent.

With respect to the pre-formed stabilizers and to the process of making these in accordance with the present invention, the (1) ethylenically unsaturated macromers are as described herein. In one embodiment, the macromers (1) may comprise (a) an amine initiated polyether polyol having a number average molecular weight of 4000 to 15000, a functionality of 3 to 8, and (b) an ethylenically unsaturated compound containing hydroxyl reactive groups, both of which are as described above.

Suitable (2) ethylenically unsaturated monomers for the preformed stabilizers of the invention include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile, are preferred.

When using a mixture of monomers, it is preferred to use a mixture of two monomers. These monomers are typically used in weight ratios of from 80:20 (styrene:acrylonitrile) to 20:80 (S:AN), or from 75:25 (S:AN) to 25:75 (S:AN).

Suitable free-radical polymerization initiators (3) for preformed stabilizer include, for example, peroxides including both alkyl and aryl hydroperoxides, alkyl and aryl peroxides, peresters, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, 1,1-di(t-butylperoxy)cyclohexane, t-butyl peroxy 3,5, 5-trimethyl hexanoate, t-butyl perbenzoate, t-butyl peroxy pivalate, t-amyl peroxy pivalate, t-butyl peroxy-2-ethyl hexanoate, 1,1-di(t-amylperoxy)cyclohexane, lauroyl peroxide, cumene hydroperoxide, t-butyl hydroperoxide, azobis (isobutyronitrile), 2,2'-azo bis-(2-methylbutyronitrile), etc. These initiators can be used individually or as a mixture of two or more components.

Suitable free-radical initiators are present in concentrations ranging from about 0.01 to about 2% by weight, or from about 0.05 to 1% by weight, or from about 0.05 to 0.5% by weight, or between any combination of the preceding upper and lower limits, inclusive, based on the total weight of the components (i.e. 100% by weight of the combined weight of the macromer, the ethylenically unsaturated monomer, the free-radical polymerization initiator and, optionally the liquid diluent and/or the chain transfer agent).

Suitable diluents (4) for the preformed stabilizers of the present invention include, for example, compounds such as monols (i.e., monohydroxy alcohols), polyols, hydrocarbons, ethers etc., and mixtures thereof. Suitable monols include all alcohols which contain at least one carbon atom, such as, for example, methanol, ethanol, n-propanol, isopropanol, n-butanol, sec.-butanol, tert-butanol, n-pentanol, 2-pentanol, 3-pentanol, etc. and mixtures thereof. A preferred monol is isopropanol.

Suitable polyols to be used as a diluent (4) comprise, for example, poly(oxypropylene) glycols, triols and higher functionality polyols. Such polyols include poly(oxypropylene-oxyethylene) polyols; however, desirably the oxyethylene content should comprise less than about 50% by weight of 100% by weight of oxyalkylene groups. The ethylene oxide can be incorporated in any fashion along the polymer chain. Stated another way, the ethylene oxide can be either incorporated in internal blocks, as terminal blocks, or may be randomly distributed along the polymer chain. It is well known in the art that polyols contain varying amounts of non-induced unsaturation. The extent of unsaturation does not affect in any adverse way the formation of the polymer polyols in accordance with the present invention.

The polyols employed can have hydroxyl numbers which vary over a wide range. In general, the hydroxyl numbers of the polyols employed in the invention can range from about 20 mg KOH/g polyol and lower, to about 280 mg KOH/g polyol and higher. The hydroxyl number is reported in mg KOH/g polyol and defined as the number of milligrams of potassium hydroxide required for the complete hydrolysis of the fully phthalated derivative prepared from 1 gram of polyol. The hydroxyl number can also be defined by the equation:

$$OH = (56.1 \times 1000 \times f)/m.w.$$

where:
OH=hydroxyl number of the polyol;
f=functionality, that is, average number of hydroxyl groups per molecule of the polyol;
and
m.w.=molecular weight of the polyol.

The exact polyol employed depends upon the end use of the polyurethane product to be produced. The molecular weight of the hydroxyl number is selected properly to result in flexible or semi-flexible foams or elastomers when the polymer polyol produced from the polyol is converted to a polyurethane. The polyols preferably possess a hydroxyl number of from about 50 mg KOH/g polyol to about 150 mg KOH/g polyol for semi-flexible foams and from about 30 mg KOH/g polyol to about 70 mg KOH/g polyol for flexible foams. Such limits are not intended to be restrictive, but are merely illustrative of the large number of possible combinations of the above polyol co-reactants.

Preferred polyol components to be used as diluents in the present invention typically include, for example, the alkylene oxide adducts of suitable starter materials having 4 or more hydroxyl groups such as, for example, pentaerythritol, sorbitol, diether of sorbitol, mannitol, diether of mannitol, arabitol, diether of arabitol, sucrose, oligomer of polyvinyl alcohol or glycidol, mixtures thereof, etc.

When using a mixture of a monol and a polyol as the diluent for the pre-formed stabilizer, the polyol preferably comprises only a minor amount of the diluent and the monol comprises a major amount. In general, the polyol will comprise less than 30 weight percent of 100% by weight of the diluent, or less than about 20 weight percent, or less than about 15 weight percent. The amount of the polyol component present in the diluent is below the concentration at which gelling occurs in the pre-formed stabilizer.

Generally, the quantity of diluent is >40% by weight, based on 100% by weight of the PFS (pre-formed stabilizer).

Polymer control agents (5) may also be present in the pre-formed stabilizers of the present invention and the process of making the pre-formed stabilizers. Suitable polymer control agents for this aspect of the present invention include, for example, isopropanol, ethanol, tert-butanol, toluene, ethylbenzene, triethylamine, dodecylmercaptan, octadecyl-mercaptan, carbon tetrachloride, carbon tetrabromide, chloroform, methylene chloride. Polymer control agents are also commonly referred to as molecular weight regulators. These compounds are employed in conventional amounts to control the molecular weight of the copolymerizate.

Suitable processes for preparing the pre-formed stabilizers are similar to known methods described in, for example, U.S. Pat. Nos. 5,196,476, 5,268,418, and 7,759,423, the disclosures of which are herein incorporated by reference. In general, the process of preparing the pre-formed stabilizer is similar to the process of preparing the polymer polyol. The temperature range is not critical and may vary from about 80 to about 150° C. or higher, and preferably from about 115 to about 125° C. or so. The catalyst and temperature should be selected such that the catalyst has a reasonable rate of decomposition with respect to the hold-up time in the reactor for a continuous flow reactor or the feed time for a semi-batch reactor.

Mixing conditions employed in this process are obtained by using a back mixed reactor (e.g. a stirred flask or stirred autoclave). The reactors of this type keep the reaction mixture relatively homogeneous and prevent localized high monomer to macromer ratios such as occur in tubular reactors, where all of the monomer is added at the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The combination of conditions selected for the preparation of the pre-formed stabilizer should not lead to cross-linking or gel formation in the pre-formed stabilizer which can adversely affect the ultimate performance in preparing the polymer polyol composition. Combinations of too low a diluent concentration, too high a precursor and/or monomer concentration, too high a catalyst concentration, too long of a reaction time, and too much unsaturation in the precursor can result in ineffective preformed stabilizer from cross-linking or gelling.

Particularly preferred processes of preparing the pre-formed stabilizers herein are those as described in, for example, U.S. Pat. Nos. 5,196,476 and 5,268,418, the disclosures of which are hereby incorporated by reference. Preferred diluents and relative concentrations, ethylenically unsaturated monomers and relative concentrations, free-radical initiators and relative concentrations, and process conditions set forth in the references U.S. Pat. Nos. 5,196, 476, 5,268,418 and 7,759,423.

It is evident that the macromers of the present invention differ from the macromers described by these references, and thus result in structurally different preformed stabilizers.

The polymer polyols of the present invention comprise the free-radical, in-situ polymerization product of (A) a base polyol, (B) the pre-formed stabilizer described herein, and (C) one or more ethylenically unsaturated monomers in the presence of (D) at least one free-radical initiator, and optionally, (E) a polymer control agent, and the process for the preparation of polymer polyols comprises free-radically polymerizing these components. The resultant polymer polyols exhibit solids contents, i.e., from 20 to 70% by weight, based on 100% by weight of the resultant polymer polyol. It is preferred that the solids content of the polymer polyols ranges from 40 to 55% by weight. These polymer polyols also exhibit good viscosities, i.e. from 2000 to 15,000 mPa·s, and good filterability.

Suitable base polyols (A) for this aspect of the present invention include, for example, base polyols such as, for example, polyether polyols. Suitable polyether polyols include those having a functionality of at least about 2, preferably at least about 2, and more preferably at least about 3. The functionality of suitable polyether polyols is less than or equal to about 8, preferably less than or equal to about 6, and most preferably less than or equal to about 5. The suitable polyether polyols may also have functionalities ranging between any combination of these upper and lower values, inclusive. The OH numbers of suitable polyether polyols is at least about 10 mg KOH/g polyol, preferably at least about 15 mg KOH/g polyol, and most preferably at least about 20 mg KOH/g polyol. Polyether polyols typically also have OH numbers of less than or equal to about 180 mg KOH/g polyol, preferably less than or equal to about 100 mg KOH/g polyol, and most preferably less than or equal to about 70 mg KOH/g polyol. The suitable polyether polyols may also have OH numbers ranging between any combination of these upper and lower values, inclusive. The (number average) molecular weights of suitable polyether polyols is typically greater than about 600, preferably at least about 2,000 and most preferably at least about 3,000. Polyether polyols typically have (number average) molecular weights of less than or equal to 15,000, more preferably less than or equal to 12,000 and most preferably less than or equal to 8,000. The suitable polyether polyols may also have (number average) molecular weights ranging between any combination of these upper and lower values, inclusive.

These polyether polyols may also have functionalities ranging from about 2 to about 8, preferably from about 2 to about 6, and most preferably from about 3 to about 5; OH numbers ranging from about 10 mg KOH/g polyol to 180 mg KOH/g polyol, preferably from about 15 mg KOH/g polyol to about 100 mg KOH/g polyol, and most preferably from about 20 mg KOH/g polyol to about 70 mg KOH/g polyol; and (number average) molecular weights ranging from greater than 600 to about 15,000, preferably about 2,000 to 12,000, and most preferably about 3,000 to 8,000.

Examples of such compounds include polyoxyethylene glycols, triols, tetrols and higher functionality polyols, polyoxypropylene glycols, triols, tetrols and higher functionality polyols, polyoxyalkylene glycols, triols, tetrols and higher functionality polyols, mixtures thereof, etc. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed.

Other suitable base polyols for the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2, 4-tirhydroxybutane, 1,2,6-trihydroxyhexane, 1,1,1-trimethyl-olethane, 1,1,1-trimethylolpropane, pentaerythritol, caprolactane, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorus acid are also useful polyols, These include ethylene oxide, 1,2-epoxypropane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable (B) pre-formed stabilizers for this aspect of the present invention include those described herein above.

The (C) ethylenically unsaturated monomers suitable for the polymer polyols of the present invention and the process of preparing these include those ethylenically unsaturated monomers described above with respect to the preparation of the pre-formed stabilizer. Other suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile, are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred styrene and acrylonitrile are used in sufficient amounts such that the weight ratio of styrene to acrylonitrile (S:AN) may be from about 80:20 to 20:80, or from about 75:25 to 25:75. These ratios are suitable for polymer polyols and the processes of preparing them, regardless of whether they comprise the ethylenically unsaturated macromers or the pre-formed stabilizers of the present invention.

Overall, the quantity of ethylenically unsaturated monomer(s) present in the polymer polyols is at least about 20% by weight, based on 100% by weight of the polymer polyol. It is preferred that the solids content is from about 20 to about 70% by weight, or from about 30 to about 60% by weight, and or from about 40 to about 55% by weight.

Suitable free-radical initiators include those as described previously for the preparation of the pre-formed stabilizers. Among the useful initiators are those catalysts having a satisfactory half-life within the temperature ranges used in forming the stabilizer, i.e. the half-life should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, 1,1-di(t-butylperoxy)cyclohexane, 1,1-di(t-amylperoxy)cyclohexane, t-butylperpivalate, t-amyl peroctoate, t-amylperoxypivalate, 2,5-dimethyl-hexane-2,5-diper-2-ethyl hexoate, t-butyl perneodecanoate, t-butylperbenzoate and 1,1-dimethyl-3-hydroxybutyl peroxy-2-ethylhexanoate, and azo catalysts such as azobis (isobutyro-nitrile), 2,2'-azo bis-(2-methoxylbutyronitrile), and mixtures thereof. Most preferred are the alkyl peroxides described above and the azo catalysts.

The quantity of initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable polymer control agents include, for example, one or more monol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred monol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of PFS A and PFS B in Table 1 of U.S. Pat. No. 7,179,882, the disclosure of which is herein incorporated by reference). The amount of crude polymer control agent in the total polymer control agent can range anywhere from 0% up to 100% by weight.

Polymer polyols comprising the pre-formed stabilizers of the present invention are prepared by utilizing the processes as disclosed in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. As described therein, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

In the process of preparing polymer polyols, the temperature range is not critical, and may vary from about 100° C. to about 140° C. or perhaps greater, or it may vary from 115° C. to 125° C. As has been noted herein, the catalyst and temperature should be selected such that the catalyst has a reasonable rate of decomposition with respect to the hold-up time in the reactor for a continuous flow reactor or the feed time for a semi-batch reactor.

The mixing conditions employed are those obtained using a back-mixer (e.g., a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The utilization of the processes as described in U.S. Pat. Nos. 5,196,476 and 5,268,418 are preferred in this aspect of the present invention since these allow for the preparation of polymer polyols with a wide range of monomer compositions, polymer contents and polymer polyols that could not be otherwise prepared with the necessary requisite stability. However, whether the utilization of the processes disclosed in U.S. Pat. Nos. 5,916,476 and 5,268,418 are essential depends on whether the process parameters are such that a satisfactory polymer polyol can be prepared without using either of these processes.

The polymer polyols of the present invention comprise dispersions in which the polymer particles (the same being either individual particles or agglomerates of individual particles) are relatively small in size and, in the preferred embodiment, are all essentially less than about one to three microns. However, when high contents of styrene are used, the particles will tend to be larger; but the resulting polymer polyols are highly useful, particularly when the end use application requires as little scorch as possible. In the preferred embodiment, essentially all of the product (i.e., about 99% by weight or more) will pass through the filter employed in the filtration hindrance (filterability) test that will be described in conjunction with the Examples. This insures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50% by weight of the product passes through the filter. Some applications may also find useful products in which only about 20% by weight or even less passes through the filter.

In accordance with the present invention, the stabilizer is present in an amount sufficient to insure that satisfactory stabilization will result in the desired filtration hindrance, centrifugible solids level and viscosity. In this regard, the quantity of pre-formed stabilizer generally ranges from about 1 to about 20% (or from about 2 to about 15%) by weight, based on the total feed. As one skilled in the art knows and understands, various factors including, for example, the free-radical initiator, the solids content, the weight ratio of S:AN, process conditions, etc., will affect the optimum quantity of pre-formed stabilizer.

Polyurethanes, preferably polyurethane foams, comprising the polymer polyols and processes for their production are also part of the present invention. Suitable polymer polyols for these polyurethanes include those prepared from pre-formed stabilizers which are based on the novel macromers described herein. These polyurethanes comprise the reaction product of a polyisocyanate component or prepolymer thereof, with an isocyanate-reactive component comprising the polymer polyols of the invention. The processes for preparing these polyurethanes comprise reacting a polyisocyanate component or prepolymer thereof, with an isocyanate-reactive component comprising the polymer polyols of the present invention.

The process of preparing the flexible polyurethane foams comprises reacting (I) a polyisocyanate component, with (II) an isocyanate-reactive component comprising the novel polymer polyols described herein, in the presence of (III) one or more catalysts, (IV) one or more blowing agents and, optionally, (V) one or more surfactants. In addition, crosslinking agents, chain extenders, other isocyanate-reactive components, etc., as described herein above, as well as various other additives and auxiliary agents may also be present.

Suitable polyisocyanates for the polyisocyanate component (I) comprise those known in the art, to be suitable for the preparation of flexible polyurethane foams. The polyisocyanates may be di- or poly-functional, and include, for example, (cyclo)aliphatic di- and/or polyisocyanates, aromatic di- and/or polyisocyanates, and araliphatic di- and/or polyisocyanates. Some specific examples of suitable aromatic polyisocyanates and aromatic diisocyanates include compounds such as toluene diisocyanate, diphenylmethane diisocyanate, polymethylene polyphenyl polyisocyanate, etc., mixtures or blends of these di- and/or polyisocyanates with one another and/or with other di- and/or polyisocyanates, including (cyclo)aliphatic isocyanates and/or araliphatic isocyanates may also be used.

Suitable compounds to be used as component (II), the isocyanate-reactive component, herein for the preparation of flexible polyurethane foams include the novel polymer polyols described herein. In accordance with the present invention, the isocyanate-reactive component (II) may additionally comprise a conventional (i.e., non-solids containing) isocyanate-reactive component such as, for example, a polyoxyalkylene polyol, a polyether polyol, a polyester polyol, a polythioether, a polyacetal, a polycarbonate, a polycarbonate ether polyol, etc., and mixtures thereof. These isocyanate-reactive compounds having a functionality of from 2 to 8, or from 2 to 6, or from 2 to 4, and a number average molecular weight of from 1000 to 12,000, or from 1000 to 8,000, or from 2000 to 6000. In addition, lower molecular weight isocyanate-reactive components such as crosslinkers and/or chain extenders may be used. These lower molecular weight isocyanate-reactive components include chain extenders which may have functionalities of 2 and number average molecular weights ranging from 61 to 500; and cross linking agents which may have functionalities of 3 to 4 and number average molecular weights ranging from 92 to less than 1000, or from 92 to less than or equal to 750. Examples of suitable chain extenders include ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, etc. Some examples of suitable crosslinking agents include glycerol, trimethylolpropane, pentaerythritol, diethanolamine, triethanolamine, etc. It is also possible to use a polyether polyol that contains a high ethylene oxide content.

At least one polyurethane catalyst is required to catalyze the reactions of the monol, polyols and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like. Preferred catalysts are amine catalysts such as, for example, bis(dimethylaminoethyl)ether in dipropylene glycol and triethylene diamine in dipropylene glycol. These are commercially available as Niax A-1 and Niax A-33, respectively.

The polyurethane catalysts are typically used in an amount within the range of about 0.05 to about 3 parts by weight, more preferably from about 0.1 to about 2 parts, per 100 parts by weight of isocyanate-reactive mixture.

Suitable (III) blowing agents for the present invention include, for example chemical blowing agents and/or physical blowing agents. Some examples of the suitable blowing agents for the present invention include water, formic acid, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal, etc. It is possible to use a mixture of blowing agent in the present invention. When using a physical blowing agent, this is typically added to the isocyanate-reactive component of the system. These can, however, also be added in the polyisocyanate component or to a combination of both the isocyanate-reactive component and to the polyisocyanate component. Blowing agents may also be used in the form of an emulsion of the isocyanate-reactive component. Combinations of water and one or more auxiliary blowing agents are also suitable herein. In addition, water may be used as the sole blowing agent.

The amount of blowing agent or blowing agent mixture used is from 0.5 to 20%, preferably from 0.75 to 10% by weight, based in each case on 100% by weight of component (B). When water is the blowing agent, it is typically present in an amount of from 0.5 to 10% by weight, and preferably from 0.75 to 7% by weight, based on 100% by weight of component (B). The addition of water can be effected in combination with the use of the other blowing agents described.

Surfactants are preferably used to prepare the foams. Surfactants are known to help stabilize the foam until it cures. Suitable surfactants for the invention are those well known in the polyurethane industry. A wide variety of organosilicone surfactants are commercially available. Examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The surfactant is typically used in an amount within the range of about 0.1 to 4, preferably from about 0.2 to 3, parts per 100 parts of isocyanate-reactive mixture. Other optional components that may be present in the flexible foam formulations include, for example, flame retardants, antioxidants, pigments, dyes, liquid and solid fillers, etc. Such commercial additives are included in the foams in conventional amounts when used.

The flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

In accordance with the present invention, the flexible foams are prepared at isocyanate indices ranges from 70 to 130, or from 80 to 120, or from 90 to 110. The term "isocyanate index", which may also be referred to as the NCO index, is defined herein as the ratio of reactive isocyanate groups (equivalents) to active hydrogen groups (equivalents), multiplied by 100%.

Although less preferred, a prepolymer approach to making the foams can also be used. In this approach, a significant portion of the isocyanate-reactive mixture is reacted with the polyisocyanate, and the resulting prepolymer is then reacted with the remaining components.

In a first embodiment, the present invention is directed to ethylenically unsaturated macromers comprising the reaction product of: (a) an amine initiated polyether polyol having a hydroxyl functionality of 3 to 8 and having a number average molecular weight of from 4000 to 15,000 which comprises the reaction product of (i) an amine compound having an amine functionality of from 1 to 6 and a molecular weight of from 60 to 1000, wherein the amine groups are selected from primary and/or secondary amine groups, and optionally from tertiary amine groups, with the proviso that one or more primary and/or secondary amine groups is also present; with (ii) an alkylene oxide; with (b) an ethylenically unsaturated compound which is present in an amount such there is at least 0.08 mole unsaturation/mole polyol present in the resultant macromer; optionally, in the presence of (c) a catalyst.

In a second embodiment, the invention is directed to the macromer according to the first embodiment which (b) the ethylenically unsaturated compound is present in a sufficient amount such that there is at least 0.10 mole unsaturation/mole polyol present in the resultant macromer.

In a third embodiment, the invention is directed to the macromer according to the first and/or second embodiments in which (a) the amine initiated polyether polyol has a number average molecular weight of about 5000 to about 14,000 and a hydroxyl functionality of about 3.5 to about 7.5.

In a fourth embodiment, the invention is directed to the macromer according to at least one of the first through the third embodiments in which (a)(i) the amine compound has a number average molecular weight of about 70 to about 800 and an amine functionality of about 2 to about 4.

In a fifth embodiment, the invention is directed to the macromer according to at least one of the first through the fourth embodiments in which (a)(i) the amine compound is free of tertiary amine groups.

In a sixth embodiment, the invention is directed to the macromer according to at least one of the first through the fifth embodiments in which (a)(i) the amine compound contains a primary amine group and/or a secondary amine group, and a hydroxyl group.

In a seventh embodiment, the invention is directed to the macromer according to at least one of the first through the sixth embodiments in which (a)(i) the amine compound comprises monoethanolamine, diethanolamine, methyl amine, ethylene diamine, diethylene triamine, triethylene tetramine, or a mixture thereof.

In an eighth embodiment, the invention is directed to the macromer according to at least one of the first through the seventh embodiments in which (b) the ethylenically unsaturated compound comprises methyl methacrylate, ethyl methacrylate, maleic anhydride, 3-isopropenyl-$\alpha,\alpha$-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

In a ninth embodiment, the invention is directed to the macromer according to at least one of the first through the eighth embodiments in which (c) the catalyst comprises a urethane catalyst.

In a tenth embodiment, the present invention is directed to a process for the preparation of ethylenically unsaturated macromers comprising (1) reacting: (a) an amine initiated polyether polyol having a hydroxyl functionality of 3 to 8 and having a number average molecular weight of from 4000 to 15,000 which comprises the reaction product of (i) an amine compound having an amine functionality of from 1 to 6 and a molecular weight of from 60 to 1000, wherein the amine groups are selected from primary and/or secondary amine groups, and optionally from tertiary amine groups, with the proviso that one or more primary and/or secondary amine groups is also present; with (ii) an alkylene oxide; with (b) an ethylenically unsaturated compound which is present in an amount such there is at least 0.08 mole unsaturation/mole polyol present in the resultant macromer; optionally, in the presence of (c) a catalyst.

In an eleventh embodiment, the invention is directed to the process according to the tenth embodiment in which (b) the ethylenically unsaturated compound is present in a sufficient amount such that there is at least 0.10 mole unsaturation/mole polyol present in the resultant macromer.

In a twelfth embodiment, the invention is directed to the process according to the tenth and/or eleventh embodiments in which (a) the amine initiated polyether polyol has a number average molecular weight of about 5000 to about 14,000 and a hydroxyl functionality of about 3.5 to about 7.5.

In a thirteenth embodiment, the invention is directed to the process according to at least one of the tenth through the twelfth embodiments in which (a)(i) the amine compound has a number average molecular weight of about 70 to about 800 and an amine functionality of about 2 to about 4.

In a fourteenth embodiment, the invention is directed to the process according to at least one of the tenth through the thirteenth embodiments in which (a)(i) the amine compound is free of tertiary amine groups.

In a fifteenth embodiment, the invention is directed to the process according to at least one of the tenth through the fourteenth embodiments in which (a)(i) the amine compound contains a primary amine group and/or a secondary amine group, and a hydroxyl group.

In a sixteenth embodiment, the invention is directed to the process according to at least one of the tenth through the fifteenth embodiments in which (a)(i) the amine compound comprises monoethanolamine, diethanolamine, methyl amine, ethylene diamine, diethylene triamine, triethylene tetramine, or a mixture thereof.

In a seventeenth embodiment, the invention is directed to the process according to at least one of the tenth through the sixteenth embodiments in which (b) the ethylenically unsaturated compound comprises methyl methacrylate, ethyl methacrylate, maleic anhydride, 3-isopropenyl-α,α-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

In an eighteenth embodiment, the invention is directed to the process according to at least one of the tenth through the seventeenth embodiments in which wherein (c) the catalyst comprises a urethane catalyst.

In a nineteenth embodiment, the invention is directed to a preformed stabilizer comprising the reaction product of (1) an ethylenically unsaturated macromer which comprises the reaction product of: (a) an amine initiated polyether polyol having a hydroxyl functionality of 3 to 8 and having a number average molecular weight of from 4000 to 15,000 which comprises the reaction product of (i) an amine compound having an amine functionality of from 1 to 6 and a molecular weight of from 60 to 1000, wherein said amine groups are selected from primary and/or secondary amine groups, and optionally from tertiary amine groups, with the proviso that one or more primary and/or secondary amine groups is also present; with (ii) an alkylene oxide; with (b) an ethylenically unsaturated compound which is present in an amount such there is at least 0.08 mole unsaturation/mole polyol present in the resultant macromer; optionally, in the presence of (c) a catalyst; with (2) at least one ethylenically unsaturated monomer; in the presence of: (3) a free-radical polymerization initiator; and, optionally, (4) a liquid diluent; and, optionally, (5) a polymer control agent.

In a twentieth embodiment, the invention is directed to the preformed stabilizer according to the nineteenth embodiment in which (1)(b) said ethylenically unsaturated compound is present in a sufficient amount such that there is at least 0.10 mole unsaturation/mole polyol present in the resultant macromer.

In a twenty-first embodiment, the invention is directed to the preformed stabilizer according to the nineteenth and/or the twentieth embodiments in which (1)(a)(i) the amine compound is free of tertiary amine groups.

In a twenty-second embodiment, the invention is directed to the preformed stabilizer according to at least one of the nineteenth through the twenty-first embodiments in which (1)(a)(i) amine compound contains a primary amine group and/or a secondary amine group, and a hydroxyl group.

In a twenty-third embodiment, the invention is directed to the preformed stabilizer according to at least one of the nineteenth through the twenty-second embodiments in which (1)(a)(i) the amine compound comprises monoethanolamine, diethanolamine, methyl amine, ethylene diamine, diethylene triamine, triethylene tetramine, or a mixture thereof.

In a twenty-fourth embodiment, the invention is directed to the preformed stabilizer according to at least one of the nineteenth through the twenty-third embodiments which (1)(b) the ethylenically unsaturated compound comprises methyl methacrylate, ethyl methacrylate, maleic anhydride, 3-isopropenyl-α,α-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

In a twenty-fifth embodiment, the invention is directed to the preformed stabilizer according to at least one of the nineteenth through the twenty-fourth embodiments in which (2) the ethylenically unsaturated monomer comprises styrene, acrylonitrile or a mixture thereof.

In a twenty-sixth embodiment, the invention is directed to the preformed stabilizer according to at least one of the nineteenth through the twenty-fifth embodiments in which (3) said free-radical polymerization initiator comprises a peroxide compound, an azo compound, or a mixture thereof.

In a twenty-seventh embodiment, the invention is directed to the preformed stabilizer according to at least one of the nineteenth through the twenty-sixth embodiments in which (5) said polymer control agent comprises isopropanol.

In a twenty-eighth embodiment, the invention relates a process for the preparation of a preformed stabilizer which comprises (A) free-radically polymerizing: (1) an ethylenically unsaturated macromer which comprises the reaction product of: (a) an amine initiated polyether polyol having a hydroxyl functionality of 3 to 8 and having a number average molecular weight of from 4000 to 15,000 which comprises the reaction product of (i) an amine compound having an amine functionality of from 1 to 6 and a molecular weight of from 60 to 1000, wherein said amine groups are selected from primary and/or secondary amine groups, and optionally from tertiary amine groups, with the proviso that one or more primary and/or secondary amine groups is also present, with (ii) an alkylene oxide; with (b) an ethylenically unsaturated compound which is present in an amount such there is at least 0.08 mole unsaturation/mole polyol present in the resultant macromer; optionally, in the presence of (c) a catalyst; with (2) at least one ethylenically unsaturated monomer; in the presence of: (3) a free-radical polymerization initiator; and, optionally, (4) a liquid diluent; and, optionally, (5) a polymer control agent.

In a twenty-ninth embodiment, the invention is directed to the process of preparing the preformed stabilizer according to the twenty-eighth embodiment in which (1)(b) the ethylenically unsaturated compound is present in a sufficient amount such that there is at least 0.10 mole unsaturation/mole polyol present in the resultant macromer.

In a thirtieth embodiment, the invention is directed to the process of preparing the preformed stabilizer according to the twenty-eighth and/or twenty-ninth embodiments in which (1)(a)(i) the amine compound is free of tertiary amine groups.

In a thirty-first embodiment, the invention is directed to the process of preparing the preformed stabilizer according to at least one of the twenty-eighth through the thirtieth embodiments in which (1)(a)(i) the amine compound contains a primary amine group and/or a secondary amine group, and a hydroxyl group.

In a thirty-second embodiment, the invention is directed to the process of preparing the preformed stabilizer according to at least one of the twenty-eighth through the thirty-first embodiments which (1)(a)(i) the amine compound comprises monoethanolamine, diethanolamine, methyl amine, ethylene diamine, diethylene triamine, triethylene tetramine, or a mixture thereof.

In a thirty-third embodiment, the invention is directed to the process of preparing the preformed stabilizer according to at least one of the twenty-eighth through the thirty-second embodiments in which (1)(b) the ethylenically unsaturated compound comprises methyl methacrylate, ethyl methacrylate, maleic anhydride, 3-isopropenyl-α,α-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

In a thirty-fourth embodiment, the invention is directed to the process of preparing the preformed stabilizer according to at least one of the twenty-eighth through the thirty-third embodiments in which (2) the ethylenically unsaturated monomer comprises styrene, acrylonitrile or a mixture thereof.

In a thirty-fifth embodiment, the invention is directed to the process of preparing the preformed stabilizer according to at least one of the twenty-eighth through the thirty-fourth embodiments in which (3) the free-radical polymerization initiator comprises a peroxide compound, an azo compound, or a mixture thereof.

In a thirty-sixth embodiment, the invention is directed to the process of preparing the preformed stabilizer according to at least one of the twenty-eighth through the thirty-fifth embodiments in which (5) the polymer control agent comprises isopropanol.

In a thirty-seventh embodiment, the invention is directed to polymer polyols comprising the free-radical, in-situ polymerization product of (A) a base polyol, with (B) a preformed stabilizer comprising (1) an ethylenically unsaturated macromer which comprises the reaction product of: (a) an amine initiated polyether polyol having a hydroxyl functionality of 3 to 8 and having a number average molecular weight of from 4000 to 15,000 which comprises the reaction product of (i) an amine compound having an amine functionality of from 1 to 6 and a molecular weight of from 60 to 1000, wherein said amine groups are selected from primary and/or secondary amine groups, and optionally from tertiary amine groups, with the proviso that one or more primary and/or secondary amine groups is also present; with (ii) an alkylene oxide; with (b) an ethylenically unsaturated compound which is present in an amount such there is at least 0.08 mole unsaturation/mole polyol present in the resultant macromer; optionally, in the presence of (c) a catalyst; with (2) at least one ethylenically unsaturated monomer; in the presence of: (3) a free-radical polymerization initiator; and, optionally, (4) a liquid diluent; and, optionally, a polymer control agent; (C) at least one ethylenically unsaturated monomer; in the presence of (D) a free-radical polymerization initiator; and, optionally, (E) a polymer control agent.

In a thirty-eighth embodiment, the invention is directed to polymer polyols according to the thirty-seventh embodiment in which (B)(1)(b) the ethylenically unsaturated compound is present in a sufficient amount such that there is at least 0.10 mole unsaturation/mole polyol present in the resultant macromer.

In a thirty-ninth embodiment, the invention is directed to polymer polyols according to the thirty-seventh and/or thirty-eighth embodiments which (B)(1)(a)(i) the amine compound is free of tertiary amine groups.

In a fortieth embodiment, the invention is directed to polymer polyols according to at least one of the thirty-seventh through the thirty-ninth embodiments in which (B)(1)(a)(i) the amine compound contains a primary amine group and/or a secondary amine group, and a hydroxyl group.

In a forty-first embodiment, the invention is directed to polymer polyols according to at least one of the thirty-seventh through the fortieth embodiments in which (B)(1)(a)(i) the amine compound comprises monoethanolamine, diethanolamine, methyl amine, ethylene diamine, diethylene triamine, triethylene tetramine, or a mixture thereof.

In a forty-second embodiment, the invention is directed to polymer polyols according to at least one of the thirty-seventh through the forty-first embodiments in which (B)(1)(b) the ethylenically unsaturated compound comprises methyl methacrylate, ethyl methacrylate, maleic anhydride, 3-isopropenyl-α,α-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

In a forty-third embodiment, the invention is directed to polymer polyols according to at least one of the thirty-seventh through the forty-second embodiments in which (B)(2) the ethylenically unsaturated monomer comprises styrene, acrylonitrile or a mixture thereof.

In a forty-fourth embodiment, the invention is directed to polymer polyols according to at least one of the thirty-seventh through the forty-third embodiments in which (B)(3) the free-radical polymerization initiator comprises a peroxide compound, an azo compound, or a mixture thereof.

In a forty-fifth embodiment, the invention is directed to polymer polyols according to at least one of the thirty-seventh through the forty-fourth embodiments in which the polymer polyol has a solids content of from 20 to 70% by weight.

In a forty-sixth embodiment, the invention is directed to polymer polyols according to at least one of the thirty-seventh through the forty-fifth embodiments in which (C) the unsaturated monomer comprises styrene, acrylonitrile or a mixture thereof.

In a forty-seventh embodiment, the invention is directed to polymer polyols according to at least one of the thirty-seventh through the forty-sixth embodiments in which (D) the free-radical polymerization initiator comprises a peroxide compound, an azo compound or a mixture thereof.

In a forty-eighth embodiment, the invention is directed to a process for the preparation of polymer polyols comprising (I) free-radically polymerizing (A) a base polyol, with (B) a preformed stabilizer comprising (1) an ethylenically unsaturated macromer which comprises the reaction product of: (a) an amine initiated polyether polyol having a hydroxyl functionality of 3 to 8 and having a number average molecular weight of from 4000 to 15,000 which comprises the reaction product of (i) an amine compound having an amine functionality of from 1 to 6 and a molecular weight of from 60 to 1000, wherein said amine groups are selected from primary and/or secondary amine groups, and optionally from tertiary amine groups, with the proviso that one or more primary and/or secondary amine groups is also present; with (ii) an alkylene oxide; with (b) an ethylenically unsaturated compound which is present in an amount such there is at least 0.08 mole unsaturation/mole polyol present in the resultant macromer; optionally, in the presence of (c) a catalyst; with (2) at least one ethylenically unsaturated monomer; in the presence of: (3) a free-radical polymerization initiator; and, optionally, (4) a liquid diluent; and, optionally, a polymer control agent; (C) at least one ethylenically unsaturated monomer; in the presence of (D) a free-radical polymerization initiator; and, optionally, (E) a polymer control agent.

In a forty-ninth embodiment, the invention is directed to the process according to the forty-eighth embodiment in which (B)(1)(b) the ethylenically unsaturated compound is present in a sufficient amount such that there is at least 0.10 mole unsaturation/mole polyol present in the resultant macromer.

In a fiftieth embodiment, the invention is directed to the process according to at least one of the forty-eighth and/or forty-ninth embodiments in which (B)(1)(a)(i) the amine compound is free of tertiary amine groups.

In a fifty-first embodiment, the invention is directed to the process according to at least one of the forty-eighth through the fiftieth embodiments in which (B)(1)(a)(i) the amine compound contains a primary amine group and/or a secondary amine group, and a hydroxyl group.

In a fifty-second embodiment, the invention is directed to the process according to at least one of the forty-eighth through the fifty-first embodiments in which (B)(1)(a)(i) the amine compound comprises monoethanolamine, diethanolamine, methyl amine, ethylene diamine, diethylene triamine, triethylene tetramine, or a mixture thereof.

In a fifty-third embodiment, the invention is directed to the process according to at least one of the forty-eighth through the fifty-second embodiments in which (B)(1)(b) the ethylenically unsaturated compound comprises methyl methacrylate, ethyl methacrylate, maleic anhydride, 3-isopropenyl-α,α-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

In a fifty-fourth embodiment, the invention is directed to the process according to at least one of the forty-eighth through the fifty-third embodiments in which (B)(2) the ethylenically unsaturated monomer comprises styrene, acrylonitrile or a mixture thereof.

In a fifty-fifth embodiment, the invention is directed to the process according to at least one of the forty-eighth through the fifty-fourth embodiments in which (B)(3) the free-radical polymerization initiator comprises a peroxide compound, an azo compound, or a mixture thereof.

In a fifty-sixth embodiment, the invention is directed to the process according to at least one of the forty-eighth through the fifty-fifth embodiments in which the polymer polyol has a solids content of from 20 to 70% by weight.

In a fifty-seventh embodiment, the invention is directed to the process according to at least one of the forty-eighth through the fifty-sixth embodiments in which (C) the unsaturated monomer comprises styrene, acrylonitrile or mixtures thereof.

In a fifty-eighth embodiment, the invention is directed to the process according to at least one of the forty-eighth through the fifty-seventh embodiments in which (D) the free-radical polymerization initiator comprises a peroxide compound, an azo compound or a mixture thereof.

In a fifty-ninth embodiment, the invention is directed to a polyurethane foam comprising the reaction product of (I) a diisocyanate or polyisocyanate component, with (II) an isocyanate-reactive component comprising the polymer polyol according to at least one of the thirty-seventh through the forty-seventh embodiments, in the presence of (III) a catalyst; (IV) a blowing agent; and (V) a surfactant.

In a sixtieth embodiment, the invention is directed to a process for the preparation of a polyurethane foam comprising reacting (I) a diisocyanate or polyisocyanate component, with (II) an isocyanate-reactive component comprising the polymer polyol according to at least one of the thirty-seventh through the forty-seventh embodiments, in the presence of (III) a catalyst; (IV) a blowing agent; and (V) a surfactant.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the working examples.

Polyol 1: a propylene oxide adduct of sorbitol containing a 8% ethylene oxide as a cap with a hydroxyl number of 28

Polyol 2: a propylene oxide adduct of glycerine containing a 12% ethylene oxide with a hydroxyl number of 52 and having a viscosity of 520 mPa·s PCA: isopropanol, a polymer control agent TMI: isopropenyl dimethyl benzyl isocyanate (an unsaturated aliphatic isocyanate) commercially available as TMI® by Allnex Initiator A: 2,2'-azobisisobutyronitrile, a free-radical polymerization initiator commercially available as VAZO 64 from E.I. Du Pont de Nemours and Co.

Initiator B: tertiary-Butylperoxy-2-ethylhexanoate

Catalyst A: bismuth neodecanoate, commercially available under the name CosCat 83 from Vertellus Catalyst B: Niax Catalyst A-1 available commercially from Momentive Performance Materials Catalyst C: Dabco Catalyst T-9 available commercially from Evonik Surfactant A: Niax Silcone L-620 available commercially from Momentive Performance Materials Iso A: an 80/20 mixture of 2,4 and 2,6-toluene diisocyanate isomers Viscosity: dynamic viscosities reported in mPa·s at 25° C.

Filtration: filterability was determined by diluting one part by weight sample (e.g. 200 grams) of polymer polyol with two parts by weight anhydrous isopropanol (e.g. 400 grams) to remove any viscosity-imposed limitations and using a fixed quantity of material relative to a fixed cross-sectional area of screen (e.g. 1⅛ in. diameter or 2.86 cm), such that all of the polymer polyol and isopropanol solutions passes by gravity through a 700-mesh screen. The 700-mesh screen is made with a Dutch twill weave. The actual screen used had a nominal opening of 30 microns. The amount of sample which passed through the screen within 600 seconds was reported in percent, and a value of 100 percent indicates that over 99 weight percent passed through the screen.

Test Methods:

OH Number (Hydroxyl Number):

The OH number was determined according to ASTM D4274-11, reported in mg [KOH]/g [polyol].

Viscosity:

Viscosity was conducted on an Anton-Paar SVM 3000 viscometer at 25° C. that has been demonstrated to give equivalent results as can be generated with ASTM-D4878-15. The instrument was calibrated using mineral oil reference standards of known viscosity.

Gel Permeation Chromatoraphy:

The number average and weight average, Mn and Mw, respectively, molecular weights were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

Solids Content and S:AN Ratio:

The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene:acrylonitrile in the total polymer. One skilled in the art will recognize that this is an analytical confirmation of the main mechanism for controlling the S/AN ratio, which is the wt. % of monomers in the total reactor feed.

Polyol Preparation

Example 1: Preparation of Pre-Catalyzed Polyol 3

Due to the limited volume of the reactor being used, a pre-catalyzed starter polyether polyol composition was prepared using the ingredients and amounts listed in Table 1. To prepare the polyether polyol composition, the 20 kg reactor was charged with triethylenetetramine (TETA) at ambient temperature. The reactor temperature was raised to 107° C. and the TETA was de-watered using vacuum distillation with a slight nitrogen sparge through the TETA. The reactor was then sealed under vacuum at 107° C. and the desired first amount of propylene oxide (PO1) was dosed to the reactor at a rate sufficient to maintain the reaction pressure below 5 psig. Once the desired amount of PO1 was fed, the reactor was held at 107° C. for a sufficient time to fully react any unreacted PO. The reactor was then cooled to 80° C. and the desired amount of aqueous potassium hydroxide (KOH) was added. The reactor temperature was raised to 107° C. and the catalyzed mixture was de-watered using vacuum distillation with a slight nitrogen sparge through the mixture. The reactor was then sealed under vacuum at 107° C. and the desired second amount of PO (PO2) was dosed to the reactor at a rate sufficient to maintain the reaction pressure below 20 psig. Once the desired amount of PO2 was fed, the reactor was held at 107° C. for a sufficient time to fully react any unreacted PO. After completion of the PO2 addition, the reaction mixture was vacuum stripped at 107° C. The reactor was then cooled and the pre-catalyzed starter polyol (Polyol 3) was collected.

TABLE 1

Pre-Catalyzed Starter Polyol 3

| TETA[1] (g) | TETA OH# (calculated) | KOH[2] (g) | PO 1[3] (g) | PO 2[3] (g) | Final OH# | Final KOH (wt %) |
|---|---|---|---|---|---|---|
| 1979.4 | 2301.9 | 1059.7 | 3463.8 | 12838.2 | 226.0 | 2.575 |

[1]Triethylenetetramine, technical grade, 60%, from Sigma-Aldrich
[2]Aqueous potassium hydroxide (45% solution) from Fisher Scientific
[3]Propylene oxide from Lyondell Chemical Company Example 2: Preparation of Polyether Polyol 4

A polyether polyol composition was prepared using the ingredients and amounts listed in Table 2. To prepare the polyether polyol composition, the 20 kg reactor was charged with the pre-catalyzed starter polyether polyol (Polyol 3 from Example 1) at ambient temperature. The reactor temperature was raised to 107° C. and the starter mixture was de-watered using vacuum distillation with a slight nitrogen sparge through the starter mixture. The reactor was then sealed under vacuum at 107° C. and the desired amount of PO was dosed to the reactor at a rate sufficient to maintain the reaction pressure below 40 psig. Once the desired amount of PO was fed, the reactor was held at 107° C. for a sufficient time to fully re act any unreacted PO. The desired amount of ethylene oxide (EO) was then dosed to the reactor at a rate sufficient to maintain the reaction pressure below 30 psig. Once the desired amount of EO was fed, the reactor was held at 107° C. for a sufficient time to fully react all of the EO. After completion of the EO addition, the reactor was cooled to 80° C. and the desired amount of water and sulfuric acid was added to fully neutralize the KOH. The sulfuric acid reacted with the KOH to form insoluble potassium sulfate salts. The reactor temperature was raised to 125° C. and the mixture was de-watered using vacuum distillation with a slight nitrogen sparge through the mixture. The reactor was cooled to 90° C. and the reactor was charged with Irganox 1076 and agitated for 30 minutes. The potassium sulfate salts were then filtered from the final polyether polyol.

TABLE 2

Polyether Polyol 4

| Pre-Catalyzed Starter Polyol 3 (g) | PO[1] (g) | EO[2] (g) | De-ionized Water (g) | Sulfuric Acid[3] (g) | Irganox 1076[4] (g) | Final OH# | Final Viscosity (mPa·s) |
|---|---|---|---|---|---|---|---|
| 2311.4 | 14069.1 | 2243.7 | 1336.8 | 66.5 | 11.2 | 32.3 | 1420 |

[1]Propylene oxide from Lyondell Chemical Company
[2]Ethylene oxide from BASF Corporation
[3]Sulfuric acid, 96%, from Sigma-Aldrich
[4]Irganox 1076 from Ciba Specialty Chemicals Corporation Example 3: Macromer Preparation Macromer A: Prepared by heating Polyol 1 (3000 g) with TMI (61 g) and Catalyst A (200 ppm) at 75° C. for 2 hours to give a product with 2022 mPa·s viscosity.
Macromer B: Prepared by heating Polyol 4 (3000 g) with TMI (61 g) and Catalyst A (200 ppm) at 75° C. for 2 hours to give a product with 1398 mPa·s viscosity.

Example 4: Preformed Stabilizer (PFS) Preparation

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 3 for PFS A (prepared from Macromer A) and PFS B (prepared from Macromer B).

TABLE 3

Preformed Stabilizer Composition

| Component | PFS |
|---|---|
| PCA type | Isopropanol |
| PCA, wt. % | 60.0% |
| Macromer, wt. % | 24.0% |
| Monomer, wt. % | 15.9% |
| Styrene/acrylonitrile weight ratio | 50:50 |
| Initiator B, wt. % | 0.1% |

Example 5: Polymer Polyol Preparation

Table 4 relates to the preparation of the polymer polyols of the present invention. These polymer polyol were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of residual monomers measured in the crude polymer polyol before stripping.

TABLE 4

Formulations for Polymer Polyols A and B:

| | PMPO A | PMPO B |
|---|---|---|
| Base Polyol | 2 | 2 |
| Polyol (wt. % in feed) | 51.72 | 49.92 |
| PFS | A | B |
| PFS (wt. % in feed) | 5.50 | 6.88 |
| Styrene (wt. % in feed) | 27.48 | 27.74 |
| Acrylonitrile (wt. % in feed) | 14.71 | 14.80 |
| Initiator | A | A |
| Initiator (wt. % in feed) | 0.25 | 0.29 |
| PCA (wt. % in feed) | 3.64 | 4.5 |
| Total Polymer (wt. %) | 44 | 45 |
| Viscosity mPa · s @ 25° C. | 3524 | 3317 |
| Filterability - 700 mesh (%) | 100 | 100 |
| Mean particle size (microns) | 1.11 | 1.30 |

Examples 6-7: Foam Preparation: A Free-Rise Foam was Prepared Using the General Formulation in Table 5

TABLE 5

Foam Formulation:

| Component | Parts by Weight |
|---|---|
| PMPO | 74.9 |
| WATER | 1.7 |
| Surfactant A (L-620) | 0.34 |
| Catalyst B (A-1) | 0.02 |
| Catalyst C (T-9) | 0.07 |
| Iso A (TDI) | 22.9 |
| NCO Index | 115 |

All the formulation ingredients except Catalyst C (Dabco T-9 catalyst) and the isocyanate component were added to a one-half gallon cylindrical container fitted with baffles. The contents were mixed at 2400 rpm for 60 seconds with an agitator having two turbine impellers. The mixture was then degassed for 15 seconds. Catalyst C (Dabco T-9 catalyst) was added at this time. After degassing, the contents were mixed at 2400 rpm for 15 seconds, during which period the isocyanate component was added with about 7 seconds of mixing remaining. The mixture was then poured into a 14×14×6-inch (35.6 cm×35.6 cm×15.2 cm) cardboard box, where it rose freely until the reaction was complete. A batch size sufficient to give a foam bun height of approximately 9 inches (22.8 cm) high was employed. The rise profile was measured by sonar, and the % foam settle reported in Table 6. A smaller % settle is indicative of a more stable foam.

TABLE 6

Foams Prepared from Polymer Polyols:

| | Example | |
|---|---|---|
| | 6* | 7 |
| PMPO | PMPO A | PMPO B |
| % Settle | 0.17 | 0.11 |
| Foam Appearance | Good | Good |

*Comparative Example

As can be seen from the examples in Table 6, the use of a macromer containing an amine-based polyol for the PMPO formation results in a more stable foam as measured by % settle of the foam.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ethylenically unsaturated macromer comprising the reaction product of:
    (a) an amine initiated polyether polyol having a hydroxyl functionality of 3 to 8, having a number average molecular weight of from 4000 to 15,000, and which comprises the reaction product of
        (i) an amine compound having an amine functionality of from 1 to 6 and a number average molecular weight of from 60 to 1000, wherein said amine groups are selected from primary and/or secondary amine groups, and optionally from tertiary amine groups, with the proviso that one or more primary and/or secondary amine groups is also present;
    with
        (ii) an alkylene oxide;
    with
    (b) an ethylenically unsaturated compound which is present in an amount such there is at least 0.08 mole unsaturation/mole polyol present in the resultant macromer;
    optionally, in the presence of
    (c) a catalyst.

2. The macromer of claim 1, wherein (b) said ethylenically unsaturated compound is present in a sufficient amount such that there is at least 0.10 mole unsaturation/mole polyol present in the resultant macromer.

3. The macromer of claim 1, wherein (a) said amine initiated polyether polyol has a number average molecular weight of about 5000 to about 14,000 and a hydroxyl functionality of about 3.5 to about 7.5.

4. The macromer of claim 1, wherein (a)(i) said amine compound has a number average molecular weight of about 70 to about 800 and an amine functionality of about 2 to about 4.

5. The macromer of claim 1, wherein (a)(i) said amine compound is free of tertiary amine groups.

6. The macromer of claim 1, wherein (a)(i) said amine compound contains a primary amine group and/or a secondary amine group, and a hydroxyl group.

7. The macromer of claim 1, wherein (a)(i) said amine compound comprises monoethanolamine, diethanolamine, methyl amine, ethylene diamine, diethylene triamine, triethylene tetramine, or a mixture thereof.

8. The macromer of claim 1, wherein (b) said ethylenically unsaturated compound comprises methyl methacrylate, ethyl methacrylate, maleic anhydride, 3-isopropenyl-α,α-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

9. A process for the preparation of the macromer according to claim 1, comprising
    (1) reacting
        (a) an amine initiated polyether polyol having a hydroxyl functionality of 3 to 8, a number average molecular weight of from 4000 to 15,000, and which comprises the reaction product of:
            (i) an amine compound having an amine functionality of from 1 to 6 and a number average molecular weight of from 60 to 1000, wherein said amine groups are selected from primary and/or secondary amine groups, and optionally from tertiary amine groups, with the proviso that one or more primary and/or secondary amine groups is also present;
        with
            (ii) an alkylene oxide;
        with
        (b) an ethylenically unsaturated compound which is present in an amount such that there is at least 0.08 mole unsaturation/mole polyol present in the resultant macromer;
        optionally, in the presence of
        (c) a catalyst.

10. The process of claim 9, wherein (b) said ethylenically unsaturated compound is present in a sufficient amount such that there is at least 0.10 mole unsaturation/mole polyol present in the resultant macromer.

11. The process of claim 9, wherein (a) said amine initiated polyether polyol has a number average molecular weight of about 5000 to about 14,000 and a hydroxyl functionality of about 3.5 to about 7.5.

12. The process of claim 9, wherein (a)(i) said amine compound has a number average molecular weight of about 70 to about 800 and an amine functionality of about 2 to about 4.

13. The process of claim 9, wherein (a)(i) said amine compound is free of tertiary amine groups.

14. The process of claim 9, wherein (a)(i) said amine compound contains a primary amine group and/or a secondary amine group, and a hydroxyl group.

15. The process of claim 9, wherein (a)(i) said amine compound comprises monoethanolamine, diethanolamine, methyl amine, ethylene diamine, diethylene triamine, triethylene tetramine, or a mixture thereof.

16. The process of claim 9, wherein (b) said ethylenically unsaturated compound comprises methyl methacrylate, ethyl methacrylate, maleic anhydride, 3-isopropenyl-α,α-dimethyl benzyl isocyanate, 2-isocyanatoethyl methacrylate, an adduct of isophorone diisocyanate with 2-hydroxyethyl methacrylate, an adduct of toluene diisocyanate with 2-hydroxypropyl acrylate, or a mixture thereof.

17. A preformed stabilizer comprising the reaction product of:
(1) an ethylenically unsaturated macromer which comprises the reaction product of:
(a) an amine initiated polyether polyol having a hydroxyl functionality of 3 to 8, having a number average molecular weight of from 4000 to 15,000, and which comprises the reaction product of
(i) an amine compound having an amine functionality of from 1 to 6 and a number average molecular weight of from 60 to 1000, wherein said amine groups are selected from primary and/or secondary amine groups, and optionally from tertiary amine groups, with the proviso that one or more primary and/or secondary amine groups is also present;
with
(ii) an alkylene oxide;
with
(b) an ethylenically unsaturated compound which is present in an amount such there is at least 0.08 mole unsaturation/mole polyol present in the resultant macromer;
optionally, in the presence of
(c) a catalyst;
with
(2) at least one ethylenically unsaturated monomer;
in the presence of:
(3) a free-radical polymerization initiator;
and, optionally,
(4) a liquid diluent;
and, optionally,
(5) a polymer control agent.

18. The preformed stabilizer of claim 17, wherein (1)(b) said ethylenically unsaturated compound is present in a sufficient amount such that there is at least 0.10 mole unsaturation/mole polyol present in the resultant macromer.

19. A process for preparing the preformed stabilizer of claim 17, comprising
(A) free-radically polymerizing:
(1) an ethylenically unsaturated macromer which comprises the reaction product of:
(a) an amine initiated polyether polyol having a hydroxyl functionality of 3 to 8, having a number average molecular weight of from 4000 to 15,000, and which comprises the reaction product of:
(i) an amine compound having an amine functionality of from 1 to 6 and a number average molecular weight of from 60 to 1000, wherein said amine groups are selected from primary and/or secondary amine groups, and optionally from tertiary amine groups, with the proviso that one or more primary and/or secondary amine groups is also present;
with
(ii) an alkylene oxide;
with
(b) an ethylenically unsaturated compound which is present in an amount such there is at least 0.08 mole unsaturation/mole polyol present in the resultant macromer;
optionally, in the presence of
(c) a catalyst;
with
(2) at least one ethylenically unsaturated monomer;
in the presence of:
(3) a free-radical polymerization initiator;
and, optionally,
(4) a liquid diluent;
and, optionally,
(5) a polymer control agent.

20. The process of claim 19, wherein (1)(b) said ethylenically unsaturated compound is present in a sufficient amount such that there is at least 0.10 mole unsaturation/mole polyol present in the resultant macromer.

21. A polymer polyol comprising the free-radical, in-situ polymerization product of:
(A) a base polyol;
with
(B) a preformed stabilizer comprising:
(1) an ethylenically unsaturated macromer which comprises the reaction product of (a) an amine initiated polyether polyol having a hydroxyl functionality of 3 to 8, having a number average molecular weight of from 4000 to 15,000, and which comprises the reaction product of (i) an amine compound having an amine functionality of from 1 to 6 and a number average molecular weight of from 60 to 1000, wherein said amine groups are selected from primary and/or second amine groups, and optionally, from tertiary amine groups with the proviso that one or more primary or secondary amine groups is also present; with (ii) an alkylene oxide; with (b) an ethylenically unsaturated compound which is present in an amount such that there is at least 0.08 mole unsaturation/mole polyol present in the resultant macromer; optionally, in the presence of (c) a catalyst;
with
(2) at least one ethylenically unsaturated monomer;
in the presence of:
(3) a free-radical polymerization initiator;
and, optionally,
(4) a liquid diluent;
and, optionally,
(5) a polymer control agent;
and
(C) at least one ethylenically unsaturated monomer;
in the presence of
(D) a free-radical polymerization initiator;
and, optionally,
(E) a polymer control agent.

22. The polymer polyol of claim 21, wherein (B)(1)(b) said ethylenically unsaturated compound is present in a sufficient amount such that there is at least 0.10 mole unsaturation/mole polyol present in the resultant macromer.

23. A process for the preparation of the polymer polyol of claim 21, comprising
(I) free-radically polymerizing:
(A) a base polyol;
(B) a preformed stabilizer comprising:
(1) an ethylenically unsaturated macromer which comprises the reaction product of (a) an amine initiated polyether polyol having a hydroxyl functionality of 3 to 8, having a number average molecular weight of from 4000 to 15,000, and which comprises the reaction product of (i) an amine compound having an amine functionality of from 1 to 6 and a number average molecular weight of from 60 to 1000, wherein said amine groups are selected from primary and/or second amine groups, and optionally, from tertiary amine groups with the proviso that one or more primary or secondary amine groups is also present; with (ii) an alkylene oxide; with (b) an ethylenically unsaturated compound which is present in an amount such that there is at least 0.08 mole unsaturation/mole polyol present in the resultant macromer; optionally, in the presence of (c) a catalyst;
with
(2) at least one ethylenically unsaturated monomer; in the presence of:
(3) a free-radical polymerization initiator; and, optionally,
(4) a liquid diluent;
and, optionally,
(5) a polymer control agent;
and
(C) at least one ethylenically unsaturated monomer; in the presence of
(D) a free-radical polymerization initiator; and, optionally,
(E) a polymer control agent.

24. The process of claim 23, wherein (B)(1)(b) said ethylenically unsaturated compound is present in a sufficient amount such that there is at least 0.10 mole unsaturation/mole polyol present in the resultant macromer.

25. A polyurethane foam comprising the reaction product of
(I) a diisocyanate or polyisocyanate component, with
(II) an isocyanate-reactive component comprising the polymer polyol of claim 21, in the presence of
(III) a catalyst,
(IV) a blowing agent,
and
(V) a surfactant.

26. A process for the preparation of a polyurethane foam comprising reacting:
(I) a diisocyanate or polyisocyanate component, with
(II) an isocyanate-reactive component comprising the polymer polyol of claim 21,
in the presence of
(III) a catalyst,
(IV) a blowing agent,
and
(V) a surfactant.

* * * * *